United States Patent [19]
Smithson

[11] 3,985,527
[45] Oct. 12, 1976

[54] BAG FILTER INSTALLATION

[75] Inventor: Douglas James Smithson, Sheffield, England

[73] Assignee: British Steel Corporation, London, England

[22] Filed: Apr. 3, 1975

[21] Appl. No.: 564,800

[30] Foreign Application Priority Data
Apr. 10, 1974 United Kingdom............... 15930/74

[52] U.S. Cl.............................. 55/341 R; 55/431; 55/473
[51] Int. Cl.² ...................................... B01D 46/02
[58] Field of Search ............ 55/338, 341, 418, 431, 55/466, 473, 291, 304

[56] References Cited
UNITED STATES PATENTS

| | | | |
|---|---|---|---|
| 1,784,339 | 12/1930 | Clasen et al. ...................... | 55/341 X |
| 1,944,268 | 1/1934 | Rathbon ........................... | 55/338 X |
| 2,626,011 | 1/1953 | Campbell.......................... | 55/304 X |
| 2,723,725 | 11/1955 | Keiffer................................ | 55/291 |
| 3,158,455 | 11/1964 | Lincoln............................. | 55/341 X |
| 3,273,317 | 9/1966 | Vicard .............................. | 55/338 X |
| 3,406,502 | 10/1968 | Wiik ..................................... | 55/341 |
| 3,618,302 | 11/1971 | Cornett............................. | 55/431 X |
| 3,853,508 | 12/1974 | Gordon et al..................... | 55/341 X |
| 3,861,893 | 1/1975 | Smith et al........................ | 55/341 X |

Primary Examiner—Frank W. Lutter
Assistant Examiner—David L. Lacey
Attorney, Agent, or Firm—Bacon & Thomas

[57] ABSTRACT

This invention relates to bag filter installations, and more particularly relates to a bag filter housing having a number of compartments each including a multiplicity of filter bags. Each compartment includes an offtake duct with a hose coupling on it and a valve by which the duct may be selectively connected to the upstream side of the fan whereby the suction from the latter is utilisable for cleaning the compartment through the hose coupling.

4 Claims, 1 Drawing Figure

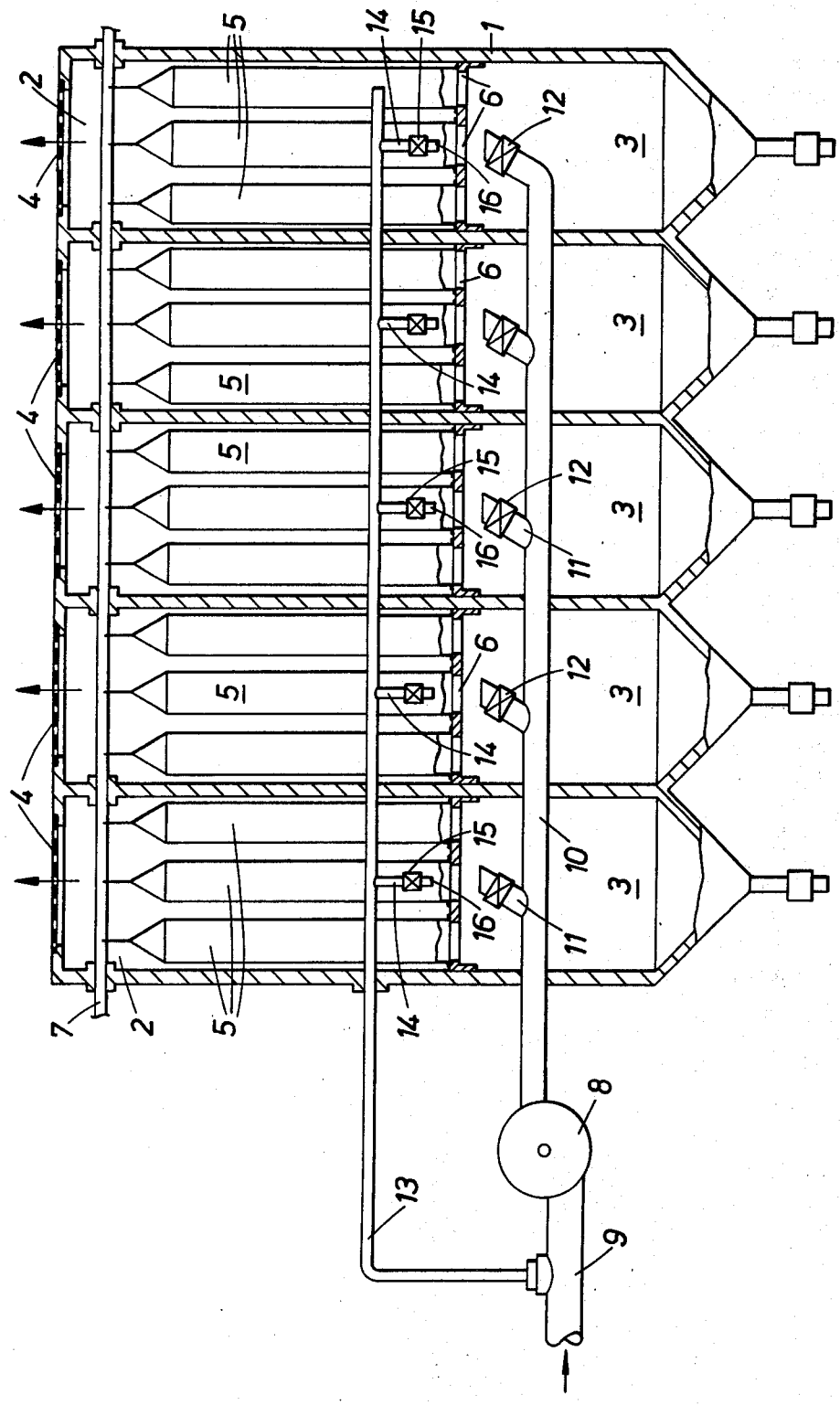

BAG FILTER INSTALLATION

This invention relates to bag filter installations, and more particularly relates to such installations in industrial plants, e.g. steelworks.

From one aspect the present invention comprises a bag filter housing having a number of compartments each including a multiplicity of filter bags for filtering dirty gases conveyed thereto by a fan, each compartment including an off-take duct with a hose coupling thereon and a valve by which the duct may be selectively connected to the upstream side of the fan whereby the fan suction is utilisable for cleaning the compartment through the hose coupling.

Preferably, the bag housing is of the positive pressure type, i.e. the fan is on the upstream or 'dirty' side of the housing the invention being more applicable to melting shop extraction than to furnace extraction in this instance since, because of the higher dirt/dust concentration, to avoid problems associated with the build-up of dust on the fan blades the fan is usually on the downstream or remote side of a filter housing for furnace extraction.

The fan may be coupled to the filter bag compartments through a common manifold having a separate leg for each compartment, a valve being provided in each leg so that any selected compartment may be isolated, e.g. for cleaning or bag maintenance etc. For this latter purpose a separate dust discharge chamber is associated with each compartment the dust gravitating into this chamber when the bags are shaken during cleaning.

In accordance with this invention then, the task of cleaning and attending to bag filter compartments is rendered more effective by the provision of suction cleaner offtakes and rendered more efficient by utilising the existing suction created by the fan. Thus a portable length of hose may be attached to the offtake hose coupling in any selected compartment for cleaning around the bags prior to repair, obviating the need for a separate suction cleaner and power point as has been the custom hitherto. In addition, there are no dust disposal problems since the dust is re-cycled to the 'operational' bag filters whereas the suction cleaner needed separate cleansing.

In order that the invention may be fully understood, one embodiment thereof will now be described, by way of example, with reference to the accompanying drawing which is a schematic sectional elevation of a bag filter housing according to this invention.

The housing (1) basically comprises a series of bag filter compartments 2 surmounting a like number of associated dust discharge chambers 3.

The compartments 2 each have a grille 4 in the roof section and each house a multiplicity of tubular fabric filter bags 5 which are mounted by ring clamps which extend around apertures 6 in the floor of the compartment. These bags are suspended from a series of arms 7 (only one of which is shown) which are reciprocably movable to shake the bags at desired intervals for cleaning.

A heavy-duty fan (or fans) 8 has an inlet duct 9 connected to fume hoods in a roof enclosure in, e.g. a steelworks melting shop, and at its output a main flow duct or manifold 10 having a number of legs 11 each coupled to a corresponding one of the discharge chambers through valves 12. A similar manifold 13 from the fan input side has a number of offtake ducts 14 individually coupled to the bag compartments 2 through valves 15, a hose coupling 16 being provided in these compartments adjacent each of the valves.

In normal operation the melting shop extraction fan 8 is running so that dirt, dust and fume are carried away through the manifold 10 and into all the filter bags 5 under positive pressure, the bags being inflated as shown.

For routine cleaning purposes the valves 12 are selectively closed and the bags 5 are shaken by the arm 7 so that the entrapped dirt and dust then falls away through the discharge chamber 3 associated with the closed valve. Fume extraction still continues during this process via the other bag filters which are operating normally.

Those dust particles which traverse the filter normally pass out into the atmosphere through the grilles, but the heavier particles will settle on the floor of the compartment accumulating there over a period of time.

More particularly, in the event of bag failure, dust will accumulate more rapidly and thus the compartments have to be cleaned out to maintain the efficiency of the installation, periodically in respect of routine maintenance and specifically in the event of bag failure.

For this purpose the operative who now enters the compartment carries with him a hose which he attaches to the hose coupling 16 and by opening the valve in the offtake 14 the floor area around the bags can readily be cleaned by the suction created by the fan through the manifold 13. Inspection of the bags can then be undertaken and a bag failure would be identifiable by the local pile of dust on the floor. The dirty gas supply to the relevant compartment would normally be isolated by the appropriate valve 12 during this period.

Routine maintenance and bag inspection can thus be carried out without undue discomfort.

We claim:
1. A bag filter installation, comprising:
a plurality of compartments in said istallation, each compartment having means defining a plurality of inlet openings and a clean air outlet opening;
a plurality of filter bags in each of said compartments;
means coupling one side of each of said filter bags in each of said compartment to a respective one of said inlet openings;
a main flow duct;
means operably connecting said main flow duct with said one side of the filter bags in each of said compartments;
a fan mounted in said main flow duct for conveying gases in the main flow duct to each of said filter bags;
manifold means connected to each of said compartments on the other side of said filter bags and to the main flow duct on the suction side of the fan;
hose coupling means in each of said compartments;
duct means connecting said coupling means in each of said compartments to the respective manifold means; and
a valve in each of said duct means by which the corresponding duct may be selectibly connected to the suction side of the fan whereby the fan suction is utilizable for cleaning local areas in the selected compartment through the hose coupling.

2. A bag filter installation according to claim 1, wherein said means operably connecting said main flow duct with said one side of the filter bags comprises a dust discharge chamber having discharge means mounted below each said compartment into which dust collected in the bags gravitates during cleaning.

3. A bag filter installation according to claim 1 wherein said means operably connecting the main flow duct with said one side of the filter bags in each of said compartments comprises a dust discharge chamber having discharge means disposed below each of said compartments and in communication with the plurality of inlet openings in the respective compartment, a separate gas conducting leg in each chamber connected to the main flow duct, and a valve in each leg whereby any selected leg may be closed and the respective compartment isolated.

4. A bag filter installation according to claim 1 wherein said means operably connecting the main flow duct with said one side of the filter bags comprises a separate leg for each compartment connected to said main flow duct, and a valve in each leg whereby any selected leg may be closed and the respective compartment isolated.

* * * * *